United States Patent Office

3,463,783
Patented Aug. 26, 1969

3,463,783
PROCESS FOR THE CONVERSION OF MERCAPTO-
BENZTHIAZOLE TO MERCAPTOBENZTHIAZYL
Richard Strauss, Lexington, and Walter Beck, Bedford,
Mass., assignors to National Polychemicals, Inc., Wilmington, Mass., a corporation of Massachusetts
No Drawing. Filed Feb. 24, 1966, Ser. No. 529,641
Int. Cl. C07d 91/48
U.S. Cl. 260—306.5         7 Claims

ABSTRACT OF THE DISCLOSURE

Dithiazyl disulfides are prepared from the corresponding mercaptothiazole by reacting an aqueous mixture containing the mercaptothiazole with an aqueous solution containing an oxidizing amount of a mono-halogenated urea mixture stabilized with urea.

---

Our invention relates to a new and unique process for preparing dithiazyl disulfides and, in particular, to a method of oxidizing 2-mercapto thiazoles to dithiazyl disulfides.

Mercaptobenzthiazyl disulfide also known as 2,2'-dithiobisbenzothiazole or MBTS is widely known and used as an accelerator for sulfur and zinc oxide curable natural and synthetic elastomers such as natural rubber, polybutadiene, rubbery copolymers of styrene and butadiene and the like. In use MBTS is typically dispersed in an amount from about 1 to 6 parts of MBTS per 100 parts of rubber. MBTS is prepared by the oxidation or conversion of a corresponding thiazole or thiazole salt. The oxidation of the thiazoles may be accomplished by the use of elemental chlorine or bromine as more particularly described in U.S. Patent 2,265,347 or by the use of a bleach solution. Past processes employing chlorine as the oxidizing agent have not been wholly satisfactory since in commercial production the yield of the thiazyl disulfide has been relatively low, 80–85 percent of theory. Past chlorine processes have also produced a relatively finely divided product.

Another common oxidizing method is to employ sodium nitrite as the oxidizing agent and to use a dilute mineral acid to release the nitrous acid. While such a method gives good yields, it does involve the use, storage and handling of both sodium nitrite and a mineral acid, and all the accompanying difficulties surrounding the use of nitrous acid. In addition, the nitrite method is a slow reaction due to foaming and evolution of nitrogen oxide gases like nitrogen dioxide during the oxidation process. Typical nitrite oxidizing methods are described more particularly in U.S. Patents 2,119,131 and 3,062,825.

In the production of MBTS and like dithiazyl disulfides employed as additives in rubbers or polymers, it is most desirable to obtain a product which has an average particle size or particle size distribution of greater than about 3.0 microns. MBTS having an average of 1 to 3.0 microns or less is known to be difficult to disperse in rubber stocks. Methods of controlled oxidation and recrystallization are, therefore, often employed to obtain a large particle size product. A typical recrystallization method used for obtaining a larger particle product is described in U.S. Patent 3,126,394. It is, therefore, desirable and advantageous to obtain a simple and practical method of oxidizing thiazyl disulfide compounds. Such a method will provide high yields, a fast reaction, give control over the particle size of the resulting product, and avoid the necessity of using mineral acids in the process.

It is an object of our invention to provide a new and unique process for the preparation of dithiazoles from mercaptothiazoles employing halogenated urea compounds as the oxidizing agent.

Another object of our invention is to provide a process for the preparation of mercaptobenzthiazyl which process has a fast reaction or oxidization cycle, high yields, and the capacity to produce a fine or relatively course particle size product depending upon the particular process reaction conditions chosen.

Other objects and advantages of our invention will be apparent to those persons skilled in the art from the following more detailed description of our invention.

Briefly, our invention comprises preparing a dithiazyl disulfide by treating a mercapto thiazole in an aqueous medium with a stabilized solution of a halogenated urea as the oxidizing agent. Our preferred oxidizing agent is a monochloro urea solution containing urea as a stabilizer which has the advantage over commonly used active chlorine compounds such as sodium hypochlorite and calcium hypochlorite and the like, due to its relatively high available chlorine content and its stability. In addition, we have found that by varying the order of addition of the reactants both finely divided and coarse particle size products can be prepared. The coarser size particles have an average particle size of greater than 3.0 microns, such as from about 4 to 7 microns, and are particularly preferred when the resulting disulfide product is to be employed as a polymer additive. The larger size particles are much more easily dispersible in rubbery polymers, while the more finely divided particles produced by present chlorinated methods, are more difficult to disperse and often require recrystallization procedures or the addition of stearates to the products to aid their dispersibility. Further, our process provides yields much higher than the yield of present chlorine-type oxidizing processes. Commercial yields with the use of chlorine or bleach are often in the range from 80–85 percent of theory, while our process permits high yields of 95 percent, e.g., 98–100 of theory based on actual mercaptobenzothiazole used.

Our process may be carried out by merely introducing one liquid solution into the other with adequate stirring and, therefore, it is relatively simple while producing a relatively fast reaction cycle. Our reaction may be conveniently carried out at ordinary room temperatures by either batch or continuous process. The temperature of reaction can be varied over a relatively wide range; however, it is generally desirable to use a temperature that will give a reasonably fast reaction cycle. Our process may be carried out at temperatures between about 20–60° C. with temperatures of 35–40° C. commonly used.

In our process the thiazole or the thiazole salts are suspended, dispersed or dissolved in solution and reacted with an aqueous solution of the halogenated urea oxidizing agent usually at a temperature of less than about 40° C. The oxidizing agent solution may be added at a controlled rate to the aqueous thiazole solution or dispersion or conversely the thiazole dispersion may be added at a controlled rate to the aqueous solution of the oxidizing agent. The addition of the oxidizing agent solution to the thiazole produces a finely divided precipitated product, while the addition of the thiazole to the oxidizing agent solution produces a precipitated product having a higher and often more desirable particle size.

Our product may be employed in the conversion or oxidization of a wide variety of thiazole compounds and salts. Some particularly useful thiazole salts which may be oxidized by our process include the water-soluble salts conforming to the structure:

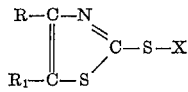

wherein R and $R_1$ are hydrogen or the same or different organic radicals such as alkyl radicals having from 1 to 10 carbon atoms, carbonyl radicals, carboxyl radicals, aryl radicals such as benzyl radicals, having from 6 to 12 carbon atoms, acyl radicals, ether radicals, cyclo aliphatic radicals or radicals wherein R and $R_1$ for a ring-like structure of either a saturated or unsaturated nature, and wherein X represents a soluble salt-forming organic or inorganic radical such as an amine, an alkali metal, an alkaline earth metal or other water-soluble salt-forming radical. Mono-valent metal radicals such as sodium, potassium, lithium, ammonium, and divalent metal radicals such as calcium form typical useful water-soluble thiazole salts as reactants.

Some mercaptothiazoles which may be treated by the process of our invention to yield the corresponding disulfides include, but are not limited to: 1-mercapto-naththo-thiazole, 1-mercapto-3-phenylbenzothiazole, 1-mercapto-4-nitrobenzothiazole, 1-mercapto-5-chlorobenzothiazole, 1-mercapto-3-methylthiazole, 1-mercaptothiazole, 1-mercapto-4-chlorobenzothiazole, 1-mercapto-5-nitrobenzothiazole, 1-mercapto-5-ethoxybenzothiazole, 1-mercapto-5-hydroxybenzothiazole, and 1-mercapto-alkylbenzothiazoles.

The preferred oxidizing agents of our discovery include the mono-bromo, mono-chloro and mixed mono-bromo chloro urea solutions which are characterized by high bromine and chlorine content. Other related chlorinated and brominated urea-type compounds may also be employed such as biurea, thiourea, alkyl, aryl and other substituted ureas and the like. Due to commercial factors such as availability and cost as well as performance a mono chloro urea solution is the preferred oxidizing agent. Our oxidizing agent may be used alone or in combination with other oxidizing agents such as elemental chlorine, elemental bromine, hydrogen peroxide, nitrites and the like. The amount of the oxidizing agent to employ depends upon the amount of available halogen in the solution and the number of mols of the thiazole to be oxidized. The amount of oxidizing agent to be employed should be at least that theoretically required to oxidize the number of mols of thiazole and usually a slight excess, e.g. 5–25 percent, should be employed. In one embodiment our method comprises dissolving the thiazole in water containing an alkali such as an alkali metal hydroxide to form the water-soluble thiazole salt, preparing a separate aqueous solution of the oxidizing agent and then reacting the oxidizing solution with the thiazole salt solution with the disulfide precipitating in the solution as the reaction proceeds.

The mono chloro or bromo urea compound is stabilized in aqueous solution by the presence of an excess of urea in the solution. The chlorinated or brominated urea mixture is prepared by reacting 1 mol of the halogen with about 2.7 to 5.0 mols of urea at temperatures of from about 0–30° C. The resulting halogenated mixture contains the active halogen in a stable aqueous solution containing the mono halogenated urea, excess urea and urea hydrohalides. Other acid acceptors like urea may be used as stabilizers; however, urea as a part of the initial process reaction is preferred. The urea should be present in stabilizing amounts such as from about 0.5 to 4.0, e.g., 1.0 to 3.0 or more mols of urea per mol of the mono halogenated urea.

Typical equations to represent the oxidation process of our invention are as follows:

(1)
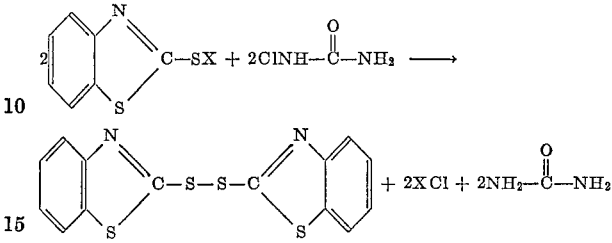

where X is monovalent metal ion (2)
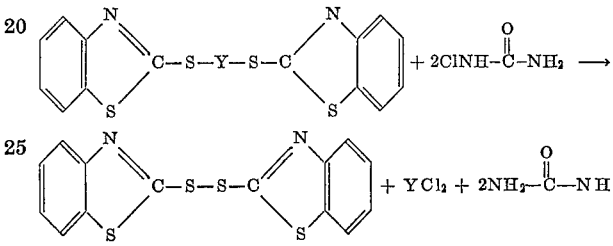

where Y is divalent metal ion.

The process of our discovery is illustrated by the following examples.

Example 1

A clear, stable, chlorinated urea solution comprising mono-chloro urea and urea was prepared by charging 267 grams (4.45 mols) of urea and 20 millimeters of water to a round bottomed 500 millimeter flask. This aqueous slurry of urea was then cooled by an ice-water bath to a temperature of between about 5 and 35° C. Gaseous elemental chlorine was then introduced into the slurry beneath the surface of the slurry with agitation in an amount of about 96 grams (1.35 mols). As the chlorine is added to the slurry mixture, the slurry gradually becomes a clear solution. This solution contained approximately 25 percent of available chlorine in the form of mono-chloro urea as well as urea and urea hydrochloride salt. The elemental chlorine may be added as gaseous or liquid chlorine. Other chloro and bromo urea compounds may be prepared in a similar manner.

Example 2

A sodium hydroxide solution is prepared by dissolving 20 gm. of sodium hydroxide in 500 gms. of water. The water-soluble sodium salt of mercaptobenzthiazole is then prepared by adding 83.5 gm. of mercaptobenzthiazole to the sodium hydroxide solution with agitation. The pH of the resulting solution is adjusted to 11.5 if necessary with additional amounts of 10 percent sodium hydroxide solution. Any dark, tar-like impurities are removed by filtration and the resulting clear solution is charged to a one liter flask equipped with a stirrer, thermometer, addition funnel, and the flask surrounded by a water bath. A separate solution is prepared by dissolving 72.0 gms. of mono-chloro urea (25.0 percent available chlorine) in 72.0 gms. of water. The chloro urea solution (12.5% available chlorine) is then added slowly over one hour to the reaction flask while the temperature is maintained at 35–45° C. An off-white precipitate begins to form as soon as the chloro urea solution is added. The pH of the reaction mass falls during the chloro urea solution addition until it reaches the 7–8 range at the end of the addition. When the chloro urea solution addition is complete, the contents of the reactor are stirred for 15 minutes and filtered with suction on a Buchner funnel. The filter cake is washed free of chlorides with tap water and dried to a moisture content of less than 0.3 percent in an oven at 50–55° C. The yield of dry MBTS product is 79.9 gms. or 99.0 percent of theory. The average particle size of the product is 1.0 to 1.5 microns, with the product melting at 174 to 176° C.

Example 3

In many rubber compounding applications, a coarser particle size mercaptobenzthiazyl sulfide is desired because it disperses more easily in the rubber compound. This may be attained by running the oxidation reaction in reverse as follows:

The sodium salt of mercaptobenzthiazole is made in solution and filtered as outlined in Example 1. A solution is prepared by dissolving 76.0 gm. of mono-chloro urea (25.0 percent available chlorine) in 76.0 gm. of water. This solution is charged to a one liter flask equipped with a stirrer, thermometer, addition funnel and with the flask surrounded by a water bath. The contents of the flask are maintained at 35 to 45° C. and the solution containing the sodium mercaptobenzthiazole is added slowly over one hour. An off-white precipitate begins to form immediately. Stirring is maintained for 15 minutes after the completion of the addition and the contents of the flask are filtered on a Buchner funnel with suction. The filter cake is washed free of chlorides and dried in the oven at 50 to 55° C. to a moisture content of less than 0.30 percent. The yield of dry product is 79.9 gms. or 99.0 percent of theory. The average particle size is 3.0 to 6.0 microns and the product melts at 174 to 176° C.

As illustrated by the above examples and disclosure our process provides a novel and unique means of oxidizing thiazoles to dithiazyl polysulfides and in preparing products of varying particle size in a relatively simple, easy manner with good yields. The above examples have been given for the purpose of illustrating our discovery and it will be apparent to those skilled in the art that various changes and modifications may be made therein without departing from the spirit or scope of our invention.

We claim:
1. A method of preparing the disulfide of the corresponding mercaptothiazole of the formula:

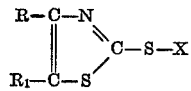

wherein R and R$_1$ are selected from the group consisting of hydrogen, alkyl radicals having 1 to 10 carbon atoms, carboxyl radicals, aryl radicals having 6 to 12 carbon atoms, and R and R$_1$ taken together form an arylene radical having up to 12 carbon atoms, and wherein each R and R$_1$ is the same or different, and wherein X is selected from the group consisting of quaternary ammonium, an alkali metal or an alkaline earth metal which method comprises:
reacting an aqueous mixture containing the mercaptothiazole with an aqueous solution containing an oxidizing amount of a mono-brominated, mono-chlorinated or mixed brominated-chlorinated urea mixture stabilized with urea said mercaptothiazole being added to the solution containing the urea mixture.

2. The method of claim 1 wherein the reaction is carried out at a temperature of from about 20 to 60° C.

3. The method of claim 1 wherein the aqueous solution contains from about 0.5 to 4.0 mols of urea per mol of the mono-halogenated urea.

4. The method of claim 1 wherein the aqueous mixture of the thiazole is an aqueous alkaline solution of a water-soluble thiazole salt.

5. The method of claim 1 wherein the mercaptothiazole is mercaptobenzthiazole.

6. The method of claim 5 wherein the aqueous solution containing mercaptobenzothiazole is added to the aqueous solution containing the oxidizing agent and mercaptobenzthiazyl disulfide having an average particle size of from about 3 to 7 microns is produced.

7. The method of claim 1 which includes:
preparing a stabilized mono-chloro urea solution by reacting one mol of chlorine with from about 2.7 to 5.0 mols of urea at a temperature of from about 0 to 30° C.;
reacting an oxidizing amount of the stabilized mono-chloro urea solution with an aqueous mixture containing a water-soluble 2-mercaptobenzthiazole salt at a temperature of below about 40° C.

References Cited

UNITED STATES PATENTS 2,265,347  12/1941  Carr _____ 260—306.5
2,468,952   5/1949  Beber _____ 260—306.5

OTHER REFERENCES

Alliger et al.: J. Org. Chem., vol. 14, pp. 962–966 (1949).

Grove et al.: J. Org. Chem., vol. 26, pp. 4131–4132 (1961).

Reid: Organic Chemistry of Bivalent Sulfur, vol. 1 (New York, 1958), pp. 124–125.

ALTON D. ROLLINS, Primary Examiner

U.S. Cl. X.R.

260—302, 306, 552, 553, 785